United States Patent
Schmidt

(10) Patent No.: US 6,381,531 B1
(45) Date of Patent: Apr. 30, 2002

(54) PROCESS AND DEVICE FOR ADJUSTING THE BRAKING EFFECT IN A VEHICLE

(75) Inventor: Günther Schmidt, Tauberbischofsheim (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/117,591
(22) PCT Filed: Nov. 28, 1997
(86) PCT No.: PCT/DE97/02783
§ 371 Date: Dec. 1, 1998
§ 102(e) Date: Dec. 1, 1998
(87) PCT Pub. No.: WO98/24667
PCT Pub. Date: Jun. 11, 1998

(30) Foreign Application Priority Data

Dec. 2, 1996 (DE) .......................................... 196 49 825

(51) Int. Cl.[7] ................ B60T 8/48; B60T 8/32
(52) U.S. Cl. .................. 701/73; 701/71; 701/80; 303/150
(58) Field of Search .................. 701/71, 73, 75, 701/78, 80, 83, 89; 303/150, 171, 174, 159, DIG. 5, DIG. 4, 147, 169, 149, 148; 188/181 A

(56) References Cited

U.S. PATENT DOCUMENTS

| | | | |
|---|---|---|---|
| 3,535,004 A | | 10/1970 | Howard et al. ............... 303/21 |
| 3,734,572 A | * | 5/1973 | Hickner et al. .......... 303/21 BE |
| 3,907,378 A | | 9/1975 | Leiber ........................ 303/21 |
| 4,384,330 A | * | 5/1983 | Matsuda et al. ............. 364/426 |
| 4,755,945 A | * | 7/1988 | Kade et al. ................. 364/426 |
| 4,881,784 A | * | 11/1989 | Lippek ........................ 303/100 |
| 5,063,514 A | * | 11/1991 | Headley et al. ......... 364/426.02 |
| 5,346,293 A | | 9/1994 | Katsumi ...................... 303/92 |
| 5,421,644 A | * | 6/1995 | Prescott et al. ............. 303/100 |
| 5,427,441 A | * | 6/1995 | Otsu ........................... 303/100 |
| 5,435,634 A | * | 7/1995 | Suto et al. .................. 303/100 |
| 5,488,557 A | * | 1/1996 | Matsuda ................. 364/426.02 |
| 5,493,495 A | * | 2/1996 | Naito et al. ............ 364/426.02 |
| 5,501,514 A | * | 3/1996 | Resch et al. ............. 303/115.4 |
| 5,511,862 A | * | 4/1996 | Fujioka ................... 303/113.4 |
| 5,584,541 A | * | 12/1996 | Sone et al. .................. 303/146 |
| 5,653,516 A | * | 8/1997 | Taniguchi et al. .......... 303/150 |
| 5,788,342 A | * | 8/1998 | Noguchi .................. 303/116.2 |

FOREIGN PATENT DOCUMENTS

| | | |
|---|---|---|
| DE | 22 43 260 | 3/1974 |
| DE | 36 27 550 | 2/1988 |
| EP | 226 077 | 6/1987 |
| GB | 2276687 | 10/1994 |

OTHER PUBLICATIONS

*"Bosch Technische Berichte" [Bosch Technical Reports], Leiber et al., Robert Bosch GmbH, Germany, vol. 7, No. 2, 1980, pp. 65–94, (Month Is Not Available).

* cited by examiner

Primary Examiner—Tan Nguyen
Assistant Examiner—Dalena Tran
(74) Attorney, Agent, or Firm—Kenyon & Kenyon

(57) ABSTRACT

The braking effect in a vehicle is set in the sense of preventing a tendency to lock-up with at least two wheels which are arranged on at least one axle on the right and left and whose motion characteristics are detected. The braking effect on the two wheels is set jointly, with at least two operating modes (select low, select high) being provided; they can be selected depending on the coefficients of friction prevailing on the wheels and/or depending on the vehicle speed. An operating mode is selected according to the value of the prevailing coefficients of friction when there are coefficient of friction differences of a preselectable lower value. As an alternative or in addition, an operating mode is selected according to the detected vehicle speed when there are coefficient of friction differences of a preselectable greater value.

17 Claims, 3 Drawing Sheets

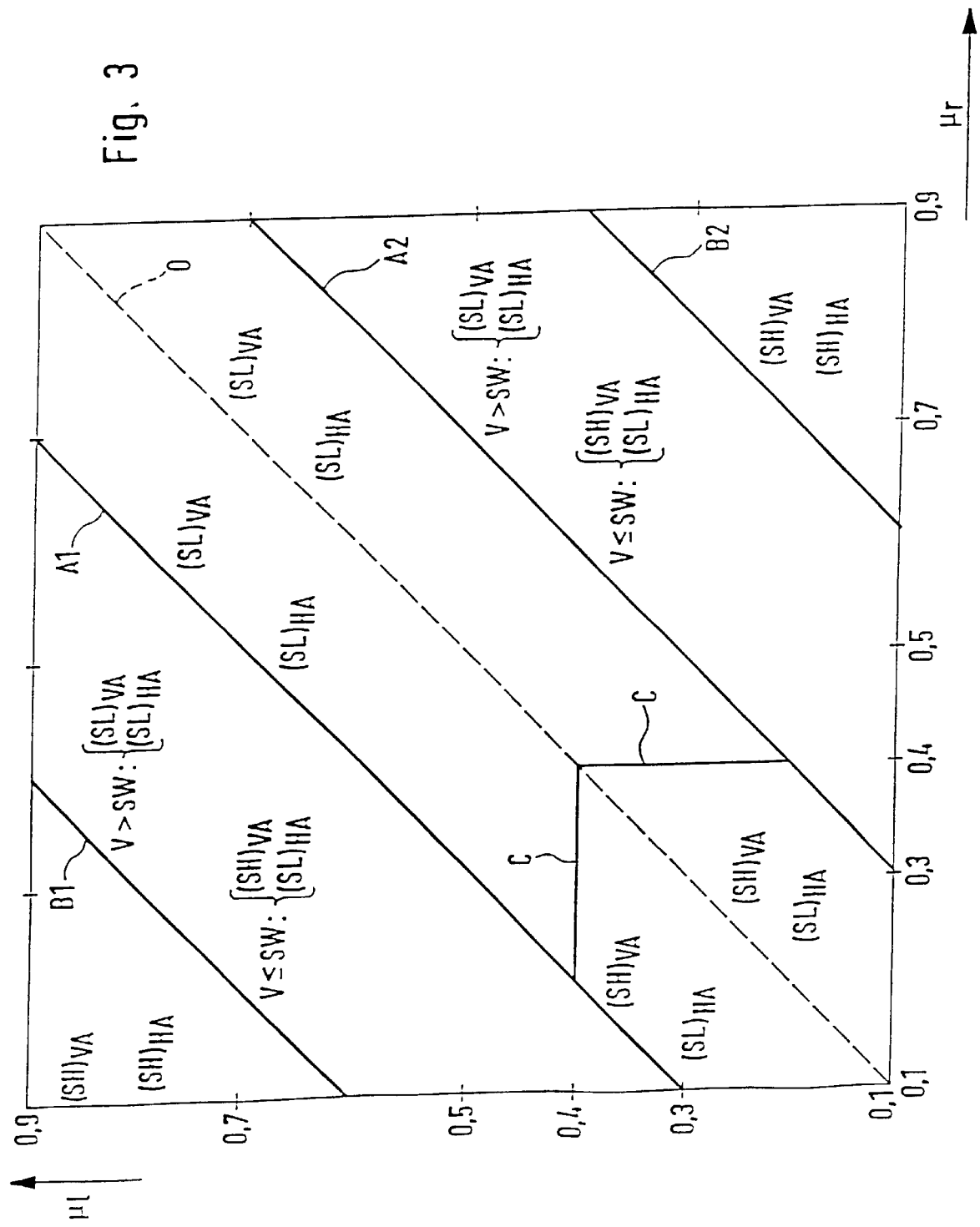

PROCESS AND DEVICE FOR ADJUSTING THE BRAKING EFFECT IN A VEHICLE

FIELD OF THE INVENTION

The present invention relates to a method and a device for adjusting the braking effect in a motor vehicle.

BACKGROUND INFORMATION

In the related art there are various known options for counteracting the tendency of a braked wheel to lock-up, for example, by manipulating the braking force on each wheel using individual control. However, for such individual control, a method of controlling braking effect on each wheel individually, i.e., separately from the other wheels should be provided. In the case of hydraulic brakes, such systems provide a control channel with the corresponding hydraulic components for each wheel brake to be controlled individually. Reference is made here to Bosch Technische Berichte, Vol. 7, No. 2, 1980 for anti-lock systems as an example.

In addition to such brake systems, however, it is also known that the braking effect on multiple wheels of a motor vehicle can be regulated or controlled jointly. German Patent No. 22 43 260 (corresponding to U.S. Pat. No. 3,907,378), for example, describes how the braking effect on the wheel brakes of the wheels of one axle can be adjusted jointly in the sense of preventing brake locking. Since the wheels on one axle may be traveling on parts of the road surface having extremely different road surface/tire coefficients of friction, it must be determined which of the wheels that are to be controlled jointly determines the braking effect. In this connection, it is known that two operating modes can be provided for jointly setting the braking effect on two wheels of one axle.

In one operating mode, the select low mode, joint setting of the braking effect, i.e., the brake pressure in general, is based on the wheel with the lower road surface/tire coefficient of friction. Thus, in the select low mode on one axle, the brake pressure on the wheel brakes of this axle is set so that the low wheel, i.e., the wheel with the lower road surface/tire coefficient of friction of the two wheels, is operated at optimum slip. Consequently, the high wheel, i.e., the wheel with the higher road surface/tire coefficient of friction, is underbraked and is stable (no excessive wheel slip), but then it can also withstand high lateral traction forces.

In the select high mode, the joint setting of the braking effect, or, in general, the brake pressure, is activated according to the wheel with the higher road surface/tire coefficient of friction. Thus, in the select high mode on one axle, the brake pressure on the wheel brakes of this axle is set so that the wheel with the higher road surface/tire coefficient of friction of the two wheels is operated at optimum slip. Consequently, the wheel with the lower road surface/tire coefficient of friction is overbraked and may even lock-up and then can withstand little or no lateral traction forces. The advantage of the select high mode, however, is that the vehicle has a relatively short braking distance.

German Patent No. 22 43 260 describes how the period of time during which the wheel is switched to select high mode is to be made to depend on the vehicle speed and/or deceleration so that the time is longer at a lower vehicle speed and/or deceleration.

Likewise, U.S. Pat. No. 3,535,004, which is cited in German Patent No. 22 43 260, describes how switching to select high mode is to be performed whenever the vehicle is traveling on a road surface with a coefficient of friction that differs significantly on the right and left sides of the vehicle.

In addition, it is known that with a two-channel ABS (braking effects on the front and rear axles are regulated jointly) or a three-channel ABS (braking effects on the rear axle are regulated jointly, but an individual setting of the braking effect is possible on the front axle), the braking effect on the rear axle is set for select low mode,.

SUMMARY OF THE INVENTION

The object of the present invention is to provide for a brake system with a joint setting of the braking effect on the wheels of at least one axle so as to achieve the greatest possible driving safety.

The present invention concerns a system for setting the braking effect in a vehicle in the sense of avoiding the tendency to lock-up, with at least two wheels which are arranged on an axle on the right and left sides with respect to the direction of travel and which travel on a road surface having different coefficients of friction, and whose motion characteristics are detected. The braking effect on the two wheels is set jointly, with two operating modes being provided, which can be selected depending on the prevailing coefficients of friction on the wheels and/or depending on the vehicle speed. In the first selectable operating mode (select low), the braking effect is jointly set depending on the motion characteristics of the wheel having the lower coefficient of friction, while in a second selectable operating mode (select high) the joint setting is based on the motion characteristics of the wheel having the higher coefficient of friction. According to present invention, the coefficients of friction of the wheels on one axle are determined, and then the difference between the coefficients of friction on the wheels on the right and left sides of the axle with respect to the direction of travel is determined. When differences between the coefficients of friction reach a predeterminable lower value, an operating mode is selected according to the prevailing coefficients of friction. As an alternative or in addition, an operating mode may be selected according to the detected vehicle speed when the coefficient of friction differences reach a predeterminable greater value.

Thus, the difference in instantaneous coefficients of friction of the road surface on the right and left sides of the vehicle is determined. If this difference is below a predetermined threshold, an operating mode is selected according to the prevailing coefficients of friction. As an alternative or in addition, an operating mode may be selected according to the detected vehicle speed when the threshold is exceeded.

Especially when used in a two-channel brake system, the present invention yields a brake system with a simple but inexpensive design that increases driving safety.

In particular, the present invention provides for the second operating mode (select high) to be chosen, in particular for the front axle of the vehicle, when there are low coefficients of friction and the coefficient of friction difference is small. With this exemplary of the present invention, locking of wheels, in particular a front wheel, is acceptable under some circumstances in order to achieve a short braking distance. However, the rear wheels should advantageously be operated in select low mode to ensure optimum lateral traction. In principle, however, the rear wheels can also be operated in the select high mode.

The first operating mode (select low) is advantageously selected, in particular for the front axle of the vehicle, when the coefficients of friction are high and the coefficient of friction difference is small. Because of the high coefficients of friction, good lateral traction of the wheels should not be sacrificed in this case.

Another advantageous exemplary calls for the second operating mode (select high) to be selected, in particular for the front axle of the vehicle, when the vehicle speed is low and the coefficient of friction difference is high. When vehicle speed is high and the coefficient of friction difference is great, the first operating mode (select low) is selected, in particular for the front axle of the vehicle. This exemplary is based on the consideration that at lower vehicle speeds, a non-optimal lateral traction of the front wheel with the lower coefficient of friction can be accepted under some circumstances to optimize the braking distance. At higher vehicle speeds, however, the select low mode should be set on the front wheels to increase the lateral traction of the front wheels and thus improve steerability. In this exemplary, however, the rear wheels should also be operated in the select low mode regardless of vehicle speed to ensure optimum lateral traction of the rear wheels and thus stable vehicle performance. In principle, however, the rear wheels may also be operated in the select high mode.

Coefficient of friction differences of a larger and/or smaller value can be detected by detecting the rotational motion of each wheel, determining the coefficients of friction on the wheels depending at least on the detected wheel motion, comparing the difference between the coefficients of friction determined on the right and left wheels with preselectable threshold values.

The wheel deceleration is determined in this case from the rotational motion thus detected. The coefficient of friction can be deduced from the wheel deceleration, in particular the maximum wheel deceleration.

One advantageous exemplary of the present invention calls for the second operating mode (select high) to be selected in particular for both axles of the vehicle when coefficient of friction differences are very great. This exemplary is based on the consideration that unacceptably long braking distances can occur due to the select low mode when coefficient of friction differences are extremely different.

The selection of an operating mode can be provided with a hysteresis according to the present invention, so that there are not too many switches (pendulum switches) between operating modes at low coefficient of friction differences.

BRIEF DESCRIPTION OF THE DRAWINGS

FIG. 3 shows switching between the two operating modes according to the present invention.

DETAILED DESCRIPTION

Figure 1:
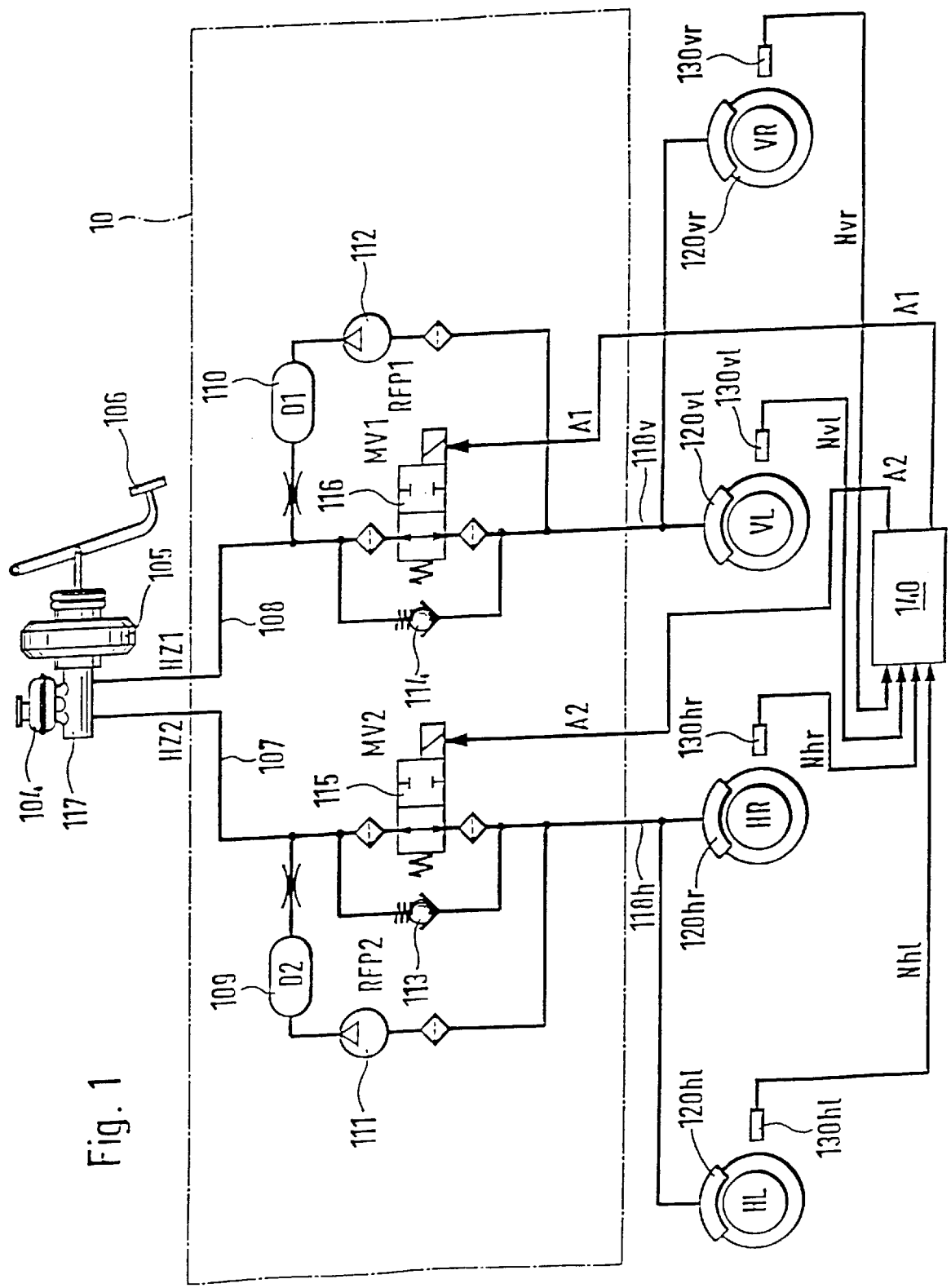
FIG. 1 shows a schematic block diagram of a two-channel brake system.

The vehicular hydraulic brake system according to the block diagram shown in FIG. 1 has a double-circuit main brake cylinder 117 with a reservoir 104 and with a brake pedal 106 which is connected to a brake booster 105 by a pedal stem. Two brake circuits HZ2 and HZ1 are provided for brakes 120hl and 120hr of the rear axle of a vehicle and 120vl and 120vr of the front axle.

Brake circuit HZ1 includes a main brake line 108 going from main brake cylinder 117 and leading to anti-lock device 10, and a wheel brake line 118v going from anti-lock device 10 and leading to wheel brakes 120vl and 120vr of the front axle. Similarly, brake circuit HZ2 includes a main brake line 107 and a wheel brake line 118h leading to wheel brakes 120hl and 120hr of the rear axle.

Anti-lock device 10 has two valves MV1 and MV2 116 and 115 which are installed in series with two nonreturn valves 114 and 113. In addition, there are two recirculating pumps RFP1 and RFP2 112 and 111 which share a drive motor (not shown). To reduce pressure surges, fluid is recirculated into main brake lines 107, 108 through two damper chambers with downstream throttles D2 and DI (109, 110).

Valves 115 and 116 are designed as 2/2-way valves which can be controlled by electromagnets (control signals A1 and A2) and are open when there is no current through the electromagnets. Depending on the position of solenoid valves 115 and 116, the brake pressure can be built up or reduced jointly for the wheel brakes of the front axle and jointly for the wheel brakes of the rear axle. Reference numbers 130hl, 130hr, 130vl and 130vr denote the wheel rpm sensors, which are essentially known and detect the rotational speeds of the respective wheels and transmit them to control unit 140 in the form of signals Nhl, Nhr, Nvl and Nvr. Depending on these input signals, control unit 140 calculates control signals A1 and A2 for driving solenoid valves 115 and 116.

Figure 2:
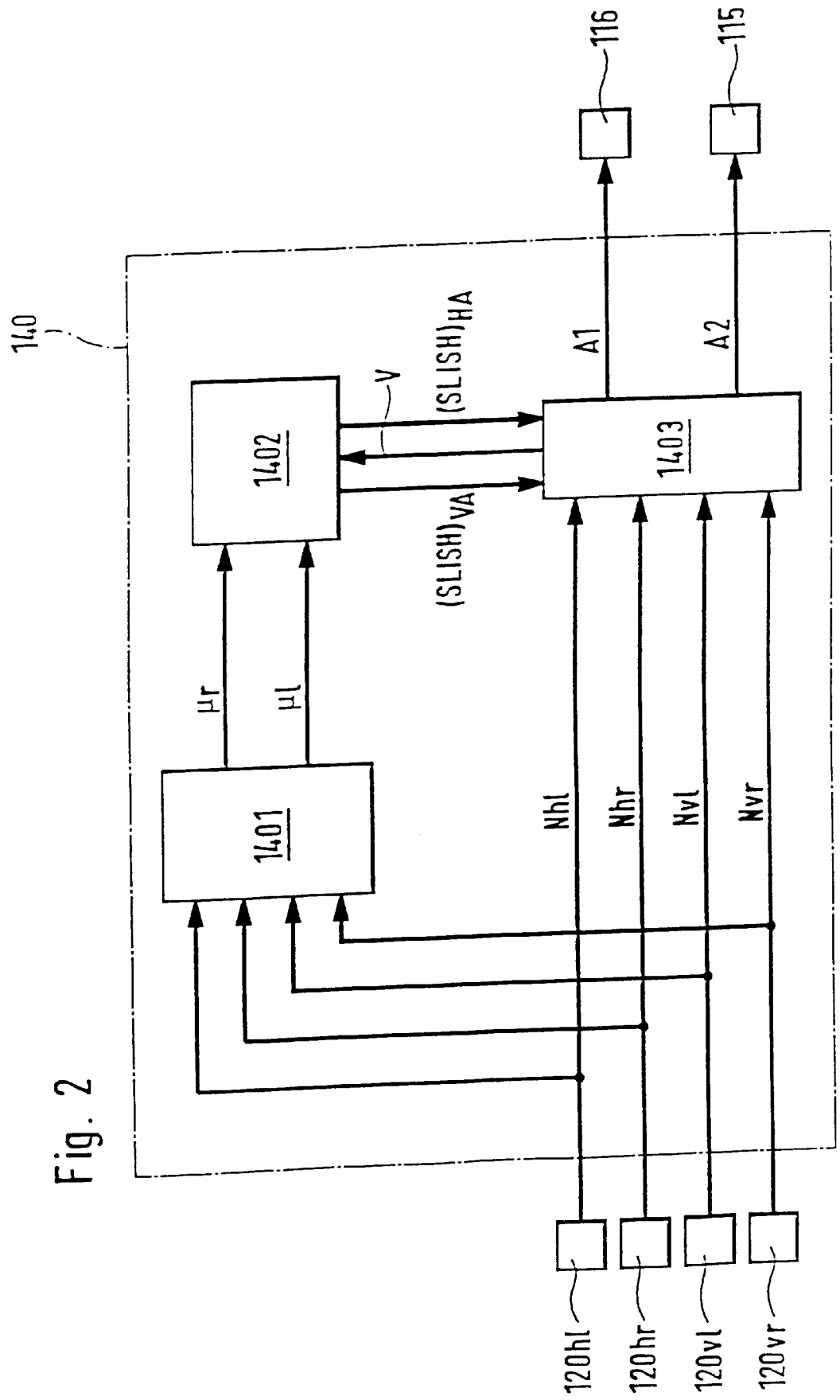
FIG. 2 shows a block diagram of a control unit that controls the brake system.

The operation of control unit 140 will be explained in is more detail with reference to FIG. 2.

In control unit 140, wheel rpm signals Nhl, Nhr, Nvl and Nvr are sent to block 1403 in addition to being sent to block 1401 just described. A reference speed representing the vehicle's longitudinal speed is first formed there from wheel rpm signals Nhl, Nhr, Nvl and Nvr. This can be accomplished in an extremely simple manner for the brake control by using the second largest wheel rpm as the reference speed (because the vehicle may be fitted with an emergency wheel with a smaller wheel radius).

In block 1403 the brake slip for each wheel is determined from the reference speed and the wheel rpm. An instability value is formed from the wheel slip thus determined and the wheel deceleration, optionally taking into account other parameters. The braking stability of each wheel can be deduced from the size of this instability value. In the case of the above-mentioned individual control, the brake pressures in each wheel brake would be controlled in such a way that stable wheel motion is achieved, i.e., there is no excessive brake slip in particular.

Control unit 140 causes the drive motor (not shown) to be switched on and thus recirculation pumps RFP1 and RFP2 to be started, depending on the detection of a risk of wheel locking on at least one of the wheels. In addition, control unit 140 causes the closing of at least the one of valves MV1/MV2 whose respective wheel is at risk of wheel locking. In this way, because valve MV1/2 is closed, hydraulic medium is conveyed back to main brake cylinder 117 from the wheel brake cylinder by recirculation pump RFP1/2, which is in operation. Consequently, the brake pressure in the wheel brake cylinder drops, the braking effect declines and the risk of wheel locking is reduced. If the risk of wheel locking is reduced to a sufficient extent, the corresponding valve MV1/2 is opened, so that it again assumes its starting position, with the result that a pressure difference between the main brake cylinder and the wheel brake cylinder is smaller due to the preceding reduction in brake pressure.

Because of the limited hydraulic design, only a joint brake pressure control on the two axles is possible, so that, as described in the preamble, the brake pressure on the axles is set so that either the stability of the wheel with the lower road surface/tire coefficient of friction is given preference in the select low mode or the stability of the wheel with the higher road surface/tire coefficient of friction is given preference in the select high mode. To differentiate which of the two modes is to be set on which axle, both signal $(SL/SH)_{VA}$ and signal $(SL/SH)_{HA}$ are sent from block 1402 to block 1403. These signals can each assume two values, depending on whether the select low mode (signal $SL_{VA}$) is to be set on the front axle, the select high mode (signal $SH_{VA}$) is to be set on the front axle, the select low mode (signal $SL_{HA}$) is to be set on the rear axle or the select high mode (signal $SH_{HA}$) is to be set on the rear axle.

To determine which operating mode is to be set at a given moment, wheel rpm signals Nhl, Nhr, Nvl and Nvr are sent to block 1401. In block 1401 the wheel deceleration values are calculated by differentiation. Since the maximum possible wheel deceleration is a direct measure of the instantaneous coefficient of friction between tire and road surface, coefficient of friction $\mu r$ for the right half of the vehicle and coefficient of friction $\mu l$ for the left half of the vehicle can be determined from the maximum wheel deceleration of the right and left wheels. These values are sent to block 1402.

In block 1402, coefficients of friction $\mu l$ and $\mu r$ are compared with one another, whereupon signals $(SL/SH)_{VA}$ and $(SL/SH)_{HA}$ are formed according to the results of this comparison, the size of the coefficients of friction and optionally instantaneous speed V of the vehicle. The diagram in FIG. 3 illustrates the formation of these signals.

FIG. 3 shows using a map the selection of operating modes according to coefficients of friction $\mu r$ and $\mu l$, on the right and left sides of the vehicle. There are no significant differences between the coefficients of friction in the area of line 0, and the vehicle is traveling on a homogeneous road surface. The differences between coefficients of friction $\mu r$ and $\mu l$ on the right and left sides of the vehicle are within certain limits in the area between lines A1 and A2. Thus, in this area the road surface may be nonhomogeneous to a limited extent. If the instantaneous coefficients of friction are in this range (between A1 and A2) and if these coefficients of friction are not too high (range below line C), the wheel brakes of the front axle are operated in the select high mode and those of the rear axle are operated in the select low mode through signals $SH_{VA}$ and $SL_{HA}$ delivered. In this range, locking of a front wheel that may occur under some circumstances is acceptable to achieve a short braking distance. The anti-lock control on the rear wheels, however, is operated in the select low mode to ensure optimum lateral traction for stable driving performance.

However, if the coefficients of friction assume higher values in the range between A1 and A2 (above line C), the select low mode is selected on both axles. Because of the high coefficients of friction, good lateral traction of all wheels should not be sacrificed in this case.

If coefficients of friction $\mu r$ and $\mu l$ on the right and left sides of the vehicle differ significantly (range between lines B1 and A1 or A2 and B2), the mode is selected as a function of longitudinal speed V of the vehicle. The reference speed of the vehicle, which is needed in block 1402 to determine the brake slip, can be sent to block 1402 as vehicle longitudinal speed V.

If vehicle longitudinal speed V is equal to or lower than a selectable threshold SW, the select high mode is selected for the wheel brakes of the front axle of the vehicle in the range between lines B1 and A1 or A2 and B2. In the range of lower speeds, the shorter braking distance may be given a higher priority than lateral traction of the low wheel.

However, if vehicle speed V is greater than a selectable threshold SW, the select low mode is selected for the wheel brakes of the front axle of the vehicle in the range between lines B1 and A1 or A2 and B2. In the higher speed range, the lateral traction of the low wheel is thus assigned a higher priority than a shorter braking distance.

Regardless of the vehicle speed, however, the anti-lock control on the rear wheels is operated in the select low mode in the range between A1 and B1 or A2 and B2 to ensure optimum lateral stability.

If the coefficient of friction differences are great (range above B1 and below B2), the select high mode is chosen on the rear axle as well as the front axle. This is due to the fact that when there is a great difference in coefficients of friction on the right and left sides of the vehicle, select low mode operation of the anti-lock system would lead to a very long braking distance because the wheel with the high coefficient of friction, the high wheel, would always be severely underbraked.

In the exemplary illustrated with reference to FIG. 3, the operating modes of the anti-lock system are selected for the front and rear axles according to the coefficients of friction $\mu r$ and $\mu l$ on the right and left sides of the vehicle. It is also possible for the choice of operating modes to be made for each axle separately according to the coefficient of friction differences on the respective axle or depending on the prevailing vehicle speed.

In addition, the switching between operating modes as a function of coefficient of friction and vehicle speed may also be provided with a hysteresis. An unreasonably high number of switches (pendulum switches) between operating modes is avoided with such a hysteresis when there are only slight fluctuations in coefficient of friction differences and slight fluctuations in vehicle speed around the threshold SW.

What is claimed is:

1. A method for controlling a braking effect in a vehicle to prevent a wheel lock-up tendency, the vehicle including at least one axle and wheels rolling on a road surface, at least one right wheel of the wheels being arranged on a right end of the at least one axle and at least one left wheel of the wheels being arranged on a left end of the at least one axle, the at least one right wheel having a first friction coefficient and the at least one left wheel having a second friction coefficient, the first friction coefficient being different from the second friction coefficient, the method comprising the steps of:

detecting first and second motion characteristics of the wheels; comparing the first friction coefficient to the second friction coefficient to determine a higher coefficient, a lower coefficient and a difference value between the first friction coefficient and the second friction coefficient;

setting the braking effect on the wheels with a joint setting device using a first operating mode and a second operating mode, wherein, in the first operating mode, the braking effect is set as a function of the first motion characteristics of a first wheel of the wheels which has the lower coefficient, and wherein, in the second operating mode, the braking effect is set as a function of the second motion characteristics of a second wheel of the wheels which has the higher coefficient; and selecting one of the first and second operating modes as a function of:

one of the first and second friction coefficients when the difference value is smaller than a predetermined value, and a speed of the vehicle when the difference value is greater than the predetermined value.

2. The method according to claim 1, wherein a magnitude of the difference value relative to the predetermined value is determined by:

determining a rotational motion of the wheels, determining the higher coefficient at least as a function of defined characteristics of the first and second motion characteristics, and comparing the difference value to [preselected threshold values] the predetermined value.

3. The method according to claim 2, wherein the defined characteristics are indicative of a maximum wheel deceleration determined from the rotational motion.

4. The method according to claim 1, further comprising the step of:

selecting the second operating mode for a front axle of the at least one axle and a rear axle of the at least one axle.

5. The method according to claim 4, wherein the second operating mode is selected for a front axle of the at least one axle and a rear axle of the at least one axle when the difference value is equal to a high predetermined value.

6. The method according to claim 1, further comprising the step of: selecting one of the first and second operating modes with hystereses.

7. A method for controlling a braking effect in a vehicle to prevent a wheel lock-up tendency, the vehicle including at least one axle and wheels rolling on a road surface, at least one right wheel of the wheels being arranged on a right end of the at least one axle and at least one left wheel of the wheels being arranged on a left end of the at least one axle, the at least one right wheel having a first friction coefficient and the at least one left wheel having a second friction coefficient, the first friction coefficient being different from the second friction coefficient, the method comprising the steps of:

detecting first and second motion characteristics of the wheels;

comparing the first friction coefficient to the second friction coefficient to determine a higher coefficient, a lower coefficient and a difference value between the first friction coefficient and the second friction coefficient;

setting the braking effect on the wheels with a joint setting device using a first operating mode and a second operating mode, wherein, in the first operating mode, the braking effect is set as a function of the first motion characteristics of a first wheel of the wheels which has the lower coefficient, and wherein, in the second operating mode, the braking effect is set as a function of the second motion characteristics of a second wheel of the wheels which has the higher coefficient;

selecting one of the first and second operating modes as a function of at least one of:

one of the first and second friction coefficients when the difference value is smaller than a predetermined value, and a speed of the vehicle when the difference value is greater than the predetermined value;

selecting the second operating mode when the difference value is smaller than the predetermined value; and selecting the first operating mode when the difference value is greater than the predetermined value.

8. The method according to claim 7, wherein the first and second operating modes are selected for a front axle of the at least one axle.

9. A method for controlling a braking effect in a vehicle to prevent a wheel lock-up tendency, the vehicle including at least one axle and wheels rolling on a road surface, at least one right wheel of the wheels being arranged on a right end of the at least one axle and at least one left wheel of the wheels being arranged on a left end of the at least one axle, the at least one right wheel having a first friction coefficient and the at least one left wheel having a second friction coefficient, the first friction coefficient being different from the second friction coefficient, the method comprising the steps of:

detecting first and second motion characteristics of the wheels;

comparing the first friction coefficient to the second friction coefficient to determine a higher coefficient, a lower coefficient and a difference value between the first friction coefficient and the second friction coefficient;

setting the braking effect on the wheels with a joint setting device using a first operating mode and a second operating mode, wherein, in the first operating mode, the braking effect is set as a function of the first motion characteristics of a first wheel of the wheels which has the lower coefficient, and wherein, in the second operating mode, the braking effect is set as a function of the second motion characteristics of a second wheel of the wheels which has the higher coefficient;

selecting one of the first and second operating modes as a function of at least one of:

one of the first and second friction coefficients when the difference value is smaller than a predetermined value, and a speed of the vehicle when the difference value is greater than the predetermined value;

selecting the second operating mode when the speed is smaller than a predetermined speed value and the difference value is greater than the predetermined value; and selecting the first operating mode when the speed is greater than the predetermined speed value and the difference value is greater than the predetermined value.

10. The method according to claim 9, wherein the first and second operating modes are selected for a front axle of the at least one axle.

11. A device for controlling a braking effect in a motor vehicle, the motor vehicle including at least one axle and wheels, at least one right wheel of the wheels being arranged on a right end of the at least one axle and at least one left wheel of the wheels being arranged on a left end of the at least one axle, the at least one right wheel having a first friction coefficient and the at least one left wheel having a second friction coefficient, the first friction coefficient being different from the second friction coefficient, the device comprising:

a first arrangement detecting motion characteristics of the wheels;

a second arrangement jointly setting the braking effect on the wheels; and a control arrangement generating control signals for controlling the second arrangement using at least two operating modes, the control arrangement determining a higher coefficient, a lower coefficient and a difference value between the first friction coefficient and the second friction coefficient by comparing the first friction coefficient to the second friction coefficient, the control arrangement selecting one of the at least two operating modes as a function of:
one of the first and second friction coefficients when the difference value is smaller than a predetermined value, and
a speed of the motor vehicle when the difference value is greater than the predetermined value,
wherein, in a first operating mode of the at least two operating modes, the second arrangement jointly sets the braking effect as a function of the motion characteristics of a first wheel of the wheels which has the lower coefficient, and
wherein, in a second operating mode of the at least two operating modes, the second arrangement jointly sets the braking effect as a function of the motion characteristics of a second wheel of the wheels which has the higher coefficient.

12. The device according to claim 11, wherein the difference value is determined by:
a third arrangement detecting a rotational motion of each of the wheels,
a fourth arrangement determining the higher coefficient at least as a function of the motion characteristics, and
a fifth arrangement comparing the difference value to predetermined threshold values.

13. The device according to claim 12, wherein the motion characteristics are indicative of a function of a maximum wheel deceleration determined from the rotational motion.

14. A device for controlling a braking effect in a motor vehicle, the motor vehicle including at least one axle and wheels, at least one right wheel of the wheels being arranged on a right end of the at least one axle and at least one left wheel of the wheels being arranged on a left end of the at least one axle, the at least one right wheel having a first friction coefficient and the at least one left wheel having a second friction coefficient, the first friction coefficient being different from the second friction coefficient, the device comprising:
a first arrangement detecting motion characteristics of the wheels;
a second arrangement jointly setting the braking effect on the wheels; and
a control arrangement generating control signals for controlling the second arrangement using at least two operating modes, the control arrangement determining a higher coefficient, a lower coefficient and a difference value between the first friction coefficient and the second friction coefficient by comparing the first friction coefficient to the second friction coefficient, the control arrangement selecting one of the at least two operating modes as a function of at least one of:
one of the first and second friction coefficients when the difference value is smaller than a predetermined value, and
a speed of the motor vehicle when the difference value is greater than the predetermined value,
wherein, in a first operating mode of the at least two operating modes, the second arrangement jointly sets the braking effect as a function of the motion characteristics of a first wheel of the wheels which has the lower coefficient, wherein, in a second operating mode of the at least two operating modes, the second arrangement jointly sets the braking effect as a function of the motion characteristics of a second wheel of the wheels which has the higher coefficient, and
wherein the control arrangement selects the second operating mode for the lower coefficient when the difference value is smaller than the predetermined value, and wherein the control arrangement selects the first operating mode for higher coefficient when the difference value is smaller than the predetermined value.

15. The device according to claim 14, wherein the control arrangement selects the first and second operating modes for a front axle of the at least one axle.

16. A device for controlling a braking effect in a motor vehicle, the motor vehicle including at least one axle and wheels, at least one right wheel of the wheels being arranged on a right end of the at least one axle and at least one left wheel of the wheels being arranged on a left end of the at least one axle, the at least one right wheel having a first friction coefficient and the at least one left wheel having a second friction coefficient, the first friction coefficient being different from the second friction coefficient, the device comprising:
a first arrangement detecting motion characteristics of the wheels;
a second arrangement jointly setting the braking effect on the wheels; and
a control arrangement generating control signals for controlling the second arrangement using at least two operating modes, the control arrangement determining a higher coefficient, a lower coefficient and a difference value between the first friction coefficient and the second friction coefficient by comparing the first friction coefficient to the second friction coefficient, the control arrangement selecting one of the at least two operating modes as a function of at least one of:
one of the first and second friction coefficients when the difference value is smaller than a predetermined value, and
a speed of the motor vehicle when the difference value is greater than the predetermined value,
wherein, in a first operating mode of the at least two operating modes, the second arrangement jointly sets the braking effect as a function of the motion characteristics of a first wheel of the wheels which has the lower coefficient,
wherein, in a second operating mode of the at least two operating modes, the second arrangement jointly sets the braking effect as a function of the motion characteristics of a second wheel of the wheels which has the higher coefficient, and
wherein the control arrangement selects the second operating mode when the speed is smaller than a predetermined speed value and when the difference value is greater than the predetermined value, and wherein the control arrangement selects the first operating mode when the speed is greater than the predetermined speed value and when the difference value is greater than the predetermined value.

17. The device according to claim 16, wherein the control arrangement selects the first and second operating modes for a front axle of the at least one axle.

* * * * *

UNITED STATES PATENT AND TRADEMARK OFFICE
CERTIFICATE OF CORRECTION

PATENT NO.    : 6,381,531 B1
DATED         : April 30, 2002
INVENTOR(S)   : Schmidt, Gunther It is certified that error appears in the above-identified patent and that said Letters Patent is hereby corrected as shown below:

Column 2,
Line 58, change "exemplary" to -- exemplary embodiment --

Column 3,
Lines 4, 10, 17, 36 and 39, change "exemplary" to -- exemplary embodiment --

Column 4,
Line 27, change "in is" to -- in --

Column 6,
Line 24, change "exemplary" to -- exemplary embodiment --

Column 7,
Lines 13-14, delete "[preselected threshold values]"

Signed and Sealed this

Second Day of September, 2003

JAMES E. ROGAN
*Director of the United States Patent and Trademark Office*